United States Patent [19]

Bergmann et al.

[11] Patent Number: 4,491,543
[45] Date of Patent: Jan. 1, 1985

[54] DIS-, TRIS-, AND TETRAKISAZO COMPOUNDS CONTAINING RESORCINOL, SULFONYLAMINO, AND TWO OR THREE SULFONIC ACID GROUPS

[75] Inventors: Udo Bergmann, Darmstadt; Guenter Hansen, Ludwigshafen; Dietrich Lach, Friedelsheim; Michael Thomas, Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 380,711

[22] Filed: May 21, 1982

[30] Foreign Application Priority Data

Jun. 19, 1981 [DE] Fed. Rep. of Germany ....... 3124172

[51] Int. Cl.³ .................... C09B 33/044; C09B 33/22; C09B 33/30; C09B 33/32
[52] U.S. Cl. .................... 534/677; 534/680; 534/684; 534/685; 534/688
[58] Field of Search ............ 260/169, 172, 187, 186, 260/173, 184, 145 C, 166, 152, 148

[56] References Cited

U.S. PATENT DOCUMENTS

| | | | |
|---|---|---|---|
| 2,018,234 | 10/1935 | Smith et al. | 260/169 |
| 2,030,991 | 2/1936 | Jordan | 260/187 |
| 2,061,545 | 11/1936 | Bosshart et al. | 260/169 |
| 2,259,735 | 10/1941 | Crossley et al. | 260/169 X |
| 2,420,630 | 5/1947 | Taylor | 260/187 |
| 2,563,091 | 8/1951 | Wright | 260/187 |
| 2,606,898 | 8/1952 | Salvin | 260/187 |
| 3,189,593 | 6/1965 | Wicki | 260/169 X |

FOREIGN PATENT DOCUMENTS

| | | | |
|---|---|---|---|
| 2238159 | 3/1976 | Fed. Rep. of Germany | 260/148 |
| 2514008 | 8/1978 | Fed. Rep. of Germany | 260/145 C |
| 2024047 | 4/1981 | Fed. Rep. of Germany | 260/145 C |
| 1109435 | 1/1956 | France | 260/187 |
| 2324689 | 4/1977 | France | 260/187 |

Primary Examiner—Floyd D. Higel
Attorney, Agent, or Firm—Oblon, Fisher, Spivak, McClelland & Maier

[57] ABSTRACT

The present invention discloses substituted phenyl di and trisazo dyes free of reactive groups having two or three sulfonic acid groups, of the general formula:

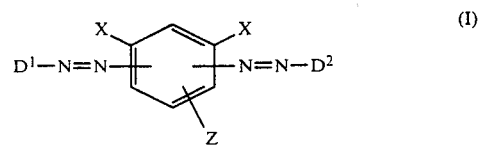

wherein $D^1$ is

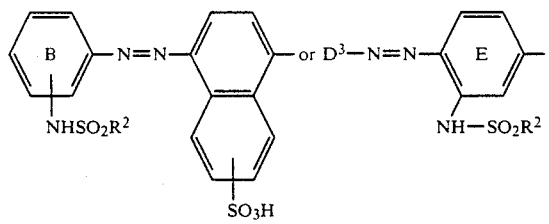

Z is hydrogen or $D^4$—N=N—; $D^2$ is phenyl substituted by hydroxyl, hydroxysulfonyl, chlorine or nitro, or is naphthyl substituted by hydroxy, hydroxysulfonyl or nitro, X, independently of one another, are hydroxyl or amino, $D^3$ is phenyl which is substituted by hydroxysulfonyl, chlorine, bromine, methyl, methoxy, ethoxy, nitro, phenylamino, sulfophenylamino or nitrosulfophenylamino, or is naphthyl which is substituted by hydroxysulfonyl; $D^4$ is phenyl which is unsubstituted or substituted by methyl, ethyl, methoxy, ethoxy, chlorine, bromine, nitro, sulfamoyl or hydroxysulfonyl, or is naphthyl which is substituted by hydroxysulfonyl; and $R^2$ is methyl, ethyl or allyl; the rings B and E may additionally be substituted by methyl, ethyl, methoxy, ethoxy, chlorine, bromine or hydroxysulfonyl, with the proviso that $D^2$ has a hydroxyl group ortho to the azo bond; or the iron, manganese, cobalt, chromium, nickel or copper complexes of this dye. These compounds, particularly in the form of their metal complexes are suitable for dyeing nitrogen-containing fibers such as wool, and preferably, leather. The present dyes yield very fast brown hues, in particular on retanned leather.

14 Claims, No Drawings

DIS-, TRIS-, AND TETRAKISAZO COMPOUNDS CONTAINING RESORCINOL, SULFONYLAMINO, AND TWO OR THREE SULFONIC ACID GROUPS

BACKGROUND OF THE INVENTION

Field of the Invention

The present invention relates to substituted phenyl di and trisazo dyes free of reactive groups containing two or three sulfonic acid groups.

SUMMARY OF THE INVENTION

This invention comprises a dye, which is free of reactive groups and contains two or three sulfonic acid groups, of the formula:

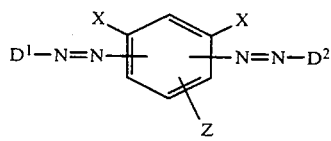
(I)

wherein
$D^1$ is

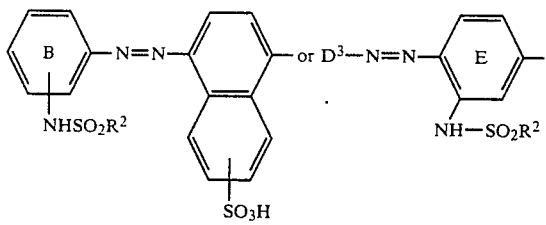

Z is hydrogen or $D^4$—N=N—;
$D^2$ is phenyl substituted by hydroxyl, hydroxysulfonyl, chlorine or nitro, or is naphthyl substituted by hydroxy, hydroxysulfonyl or nitro;
X, independently of one another, are hydroxyl or amino,
$D^3$ is substituted by hydroxysulfonyl, chlorine, bromine, methyl, methoxy, ethoxy, nitro, phenylamino, sulfophenylamino or nitrosulfophenylamino; or is naphthyl which is substituted by hydroxysulfonyl;
$D^4$ is phenyl which is unsubstituted or substituted by methyl, ethyl, methoxy, ethoxy, chlorine, bromine, nitro, sulfamoyl or hydroxysulfonyl, or is naphthyl which is substituted by hydroxysulfonyl; and
$R^2$ is methyl, ethyl or allyl;
the rings B nd E may additionally be substituted by methyl, ethyl, methoxy, ethoxy, chlorine, bromine or hydroxysulfonyl, with the proviso that $D^2$ has a hydroxyl group ortho to the azo bond; or
the iron, manganese, cobalt, chromium, nickel or copper complexes of this dye.

Having now briefly described the invention, a more omplete understanding of the invention can be obained by reference to the description of the preferred mbodiments which is provided herein for purposes of lustration only, and are not intended to be limiting nless otherwise specified.

The present invention relates to compounds, which re free of reactive groups, of the general formula I

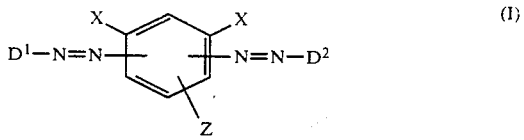

where $D^1$ is a radical of the formula

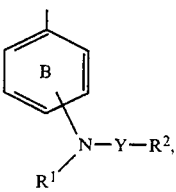

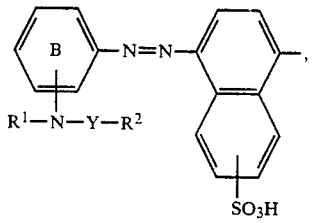

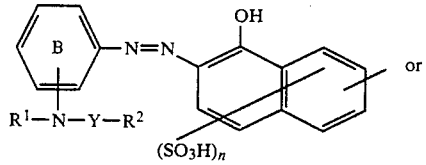  or

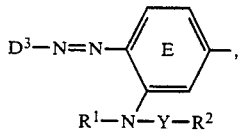

Z is hydrogen or a radical of the formula $D^4$—N=N—, $D^2$ is the radical of a diazo component, and the radicals X independently of one another are each hydroxyl, amino or substituted amino, and n is 1 or 2, $D^3$ is the radical of a diazo component, $D^4$ is phenyl which is unsubstituted or substituted by methyl, ethyl, methoxy, ethoxy, chlorine, bromine, nitro, sulfamoyl or hydroxysulfonyl, or is naphthyl which is substituted by hydroxysulfonyl, $R^1$ is hydrogen or alkyl, $R^2$ is an unsubstituted or substituted alkyl, alkenyl, aralkyl, cycloalkyl or aromatic radical or a substituted amine radical, and Y is —CO— or —SO$_2$—, and the ring B may additionally substituted by unsubstituted or substituted alkyl, alkoxy, phenoxy, acyloxy, alkylthio, arylthio, fluorine, chlorine, bromine, cyano, substituted sulfonyl, hydroxysulfonyl, sulfonic acid amide, sulfonic acid ester, carboxylic acid ester, acylamino or unsubstituted or substituted carboxamide, and the ring E may be additionally substituted by unsubstituted or substituted alkyl, alkoxy, phenoxy, acyloxy, alkylthio, arylthio, fluorine, chlorine, bromine, cyano, substituted sulfonyl, hydroxysulfonyl, sulfonic acid ester, carboxylic acid ester, acylamino or unsubstituted or substituted carboxamide, with the proviso that one or both of the radicals $D^1$ and $D^2$ have a hydroxyl group ortho to the azo bond, and the iron, manganese, cobalt, chromium, nickel and copper complexes of these dyes.

The radicals $D^2$ and $D^3$ are preferably derived from the benzene or naphthalene series, and may be substituted by conventional substituents, for example by fluorine, chlorine, bromine, nitro, cyano, substituted sulfonyl, hydroxysulfonyl, unsubstituted or substituted aminosulfonyl, carboxyl, carboxylic acid ester, carboxamide, hydroxyl, alkyl, alkoxy, phenoxy, substituted amino or acylamino, or by phenylazo which is unsubstituted or substituted by chlorine, bromine, nitro or hydroxysulfonyl.

Specific examples of diazo components $D^2$ and $D^3$ are: aniline, o-, m- and p-toluidine, o-, m- and p-chloroaniline, o-, m- and p-anisidine, o-, m- and p-nitroaniline, 2-nitro-4-methylaniline, 3-nitro-4-methylaniline, 2-nitro-4-chloroaniline, 2-methyl-5-nitroaniline, 2-methyl-4-nitroaniline, 2-chloro-4-nitroaniline, 4-nitroaniline-2-methylsulfone, aniline-o-, -m- and -p-sulfonic acid, 2-amino-3-chlorobenzenesulfonic acid, 2-amino-4-chlorobenzenesulfonic acid, 2-amino-5-chlorobenzenesulfonic acid, 3-amino-4-chlorobenzenesulfonic acid, 2-chloro-5-aminobenzenesulfonic acid, 3-chloro-4-aminobenzenesulfonic acid, 4-amino-3,6-dichlorobenzenesulfonic acid, 2-amino-5-methylbenzenesulfonic acid, 2-methyl-5-aminobenzenesulfonic acid, 2-methnyl-4-aminobenzenesulfonic acid, 3-amino-4,6-dimethylbenzenesulfonic acid, 2-amino-5-methoxybenzenesulfonic acid, 2-methyloxy-5-aminobnzenesulfonic acid, 2-amino-4-chloro-5-methylbenzenesulfonic acid, 2-amino-4-methyl-5-chlorobenzenesulfonic acid, 2-amino-5-nitrobenzenesulfonic acid, 3-nitro-4-aminobenzenesulfonic acid, aniline-2,4-disulfonic acid, aniline-2,5-disulfonic acid, 2-aminotoluene-4,5-disulfonic acid, 2-aminochlorobenzene-3,5-disulfonic acid, 2-aminotoluene-3,5-disulfonic acid, 2-amino-3,5-dimethylbenzenesulfonic acid, 4-aminoanisole-2,5-disulfonic acid, 2-amino-4-methoxybenzenesulfonic acid, 2-amino-4-methoxy-6-nitrobenzenesulfonic acid, 3-amino-6-methoxybenzenesulfonic acid, 2-amino-5-methoxybenzenesulfonic acid, 2-amino-5-ethoxybenzenesulfonic acid, 2-phenoxy-5-aminobenzenesulfonic acid, 4-aminodiphenylamine-2-sulfonic acid, 4-nitro-4'-aminodiphenylamine-2-sulfonic acid, 4-nitro-3'-chloro-4'-aminodiphenylamine-2-sulfonic acid, 4-nitro-4'-aminodiphenylamine3'-sulfonic acid, 4-methoxy-4'-aminodiphenylamine-2'-sulfonic acid, 4-hydroxy-4'-aminodiphenylamine-2'-sulfonic acid, 2-methoxy-4'-aminodiphenylamine-2'-sulfonic acid, 4-methyl-4'-aminodiphenylamine-2'-sulfonic acid, 4'-nitro-4-aminostilbene-2,2'-disulfonic acid, 2-amino-4-acetaminobenzenesulfonic acid, 2-amino-5-acetaminobenzenesulfonic acid and o-, m- and p-aminobenzoic acid, and the $C_1$-$C_4$-alkyl esters thereof, aniline-3- and -4-sulfonamide, o- and p-aminobenzonitrile, acetmetamic and acetparamic acid, yellow acid and di-yellow acid, 4-aminoazotoluene-4'-sulfonic acid, 4-allylsulfonylaniline, 3-allylsulfonylaniline, 2-allylsulfonylaniline, 4-propen-1'-ylsulfonylaniline, 2-aminobenzene-5-sulfonic acid, 3-amino-6-nitrobenzoic acid, 3-nitro-4-aminobenzoic acid, 2-naphthylamine-1-sulfonic acid, 2-napthylamine-5-sulfonic acid, 2-naphthylamine-6-sulfonic acid, 2-naphthylamine-7-sulfonic acid, 2-naphthylamine-8-sulfonic acid, 2-naphthylamine-1,5-disulfonic acid, 2-naphthylamine-3,6-disulfonic acid, 2-naphthylamine-4,8-disulfonic acid, 2-naphthylamine-5,7-disulfonic acid, 2-naphthylamine-6,8-disulfonic acid, 2-naphthylamine-6-nitro-4,8-disulfonic acid, 2-naphthylamine-1,5,7-trisulfonic acid, 2-naphthylamine-3,6,8-trisulfonic acid, 2 -napthylamine-4,6,8-trisulfonic acid, 1-napthylamine-2-sulfonic acid, 1-naphthylamine-3-sulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-8-sulfonic acid, 1-naphthylamine-3,6-disulfonic acid, 1-naphthylamine-3,8-disulfonic acid, 1-naphthylamine-4,7-disulfonic acid, 1-naphthylamine-4,8-disulfonic acid, 1-naphthylamine-3,6,8-trisulfonic acid, 1-naphthylamine-4,6,8-trisulfonic acid, 2-aminophenol, 2-amino-4-methylphenyl, 2-amino-4-chlorophenol, 2-amino-4,6-dichlorophenol, 2-amino-3,4,6-trichlorophenol, 2-amino-4-nitrophenol, 2-amino-5-nitrophenol, 2-amino-4,6-dinitrophenol, 2-amino-4-chloro-5-nitrophenol, 2-amino-4-chloro-6-nitrophenol, 2-amino-4-nitro-6-chlorophenol, 2-amino-4-methyl-6-nitrophenol, 3-amino-4-hydroxybenzenesulfonic acid, 3-amino-4-hydroxybenzenesulfonamide, 3-amino-4-hydroxy-5-chlorobenzenesulfonic acid, 2-hydroxy-3-amino-5-chlorobenzenesulfonic acid, 2-hydroxy-3-amino-5-methylbenzenesulfonic acid, 3-amino-4-hydroxy-5-nitrobenzenesulfonic acid, 2-hydroxy-3-amino-5-nitrobenzenesulfonic acid, 2-aminophenol-4,6-disulfonic acid, 3-amino-4-hydroxy-5-carboxybenzenesulfonic acid, 2-amino-3-naphthol, 2-amino-3-naphthol-6-sulfonic acid, 6-nitro-1-diazo-2-naphthol-4-sulfonic acid and 1-diazo-2-naphthol-4-sulfonic acid.

Examples of substituted amino radicals X are: dimethylamino, diethylamino, dipropylamino, morpholino, piperidino and pyrrolidino.

$R^1$ is preferably hydrogen, methyl, ethyl, n-propyl, i-propyl or butyl.

Examples of radicals $R^2$ are methylamino, ethylamino, methyl, ethyl, n- and i-propyl, n- and i-butyl, $\beta$-methoxyethyl, $\beta$-ethoxyethyl, allyl, but-2-en-1-yl, benzyl, $\beta$-phenylethyl, cyclopentyl, cyclohexyl, phenyl, o-, m- nd p-methylphenyl, o-, m- and p-chlorophenyl, o-, m- and p-methoxyphenyl, o-, m- and p-acetaminophenyl, dimethylamino, diethylamino, dipropylamino, methylethylamino, dibutylamino, pyrrolidino, piperidino, morpholino and N-methylpiperazino.

When Y is , amino, methylamino, ethylamino, n- and i-propylamino, butylamino, $\beta$-carboxyvinyl, $\beta$-carboxyethyl, $\beta$-carboxypropyl, carboxymethyloxymethyl and carboxymethylthiomethyl are also suitable.

The compounds of the formula I may be prepared by reacting, for example, a diazo compound of the formula $$D^1-NH_2$$

with a compound of the formula

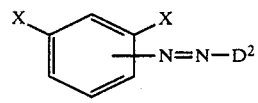

and converting the product into the metal complex, if required. The reactions are known in principle, and may be carried out similarly to methods which have been described. Details of the reactions may be found in the Examples, in which parts and percentages are by weight, unless stated otherwise.

The compounds of the formula I, particularly in the form of their metal complexes, are suitable for dyeing nitrogen-containing fibers, such as wool and, preferably, leather. Essentially, very fast brown hues are obtained, in particular on retanned leather.

The iron complexes are preferred.

Of particular industrial importance are compounds of the formula I where X is OH, Y is —SO$_2$—, R$^1$ is H, and R$^2$ is alkyl or a radical of the formula

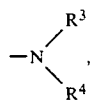

where R$^3$ and R$^4$ are each C$_1$-C$_8$-alkyl, or, together with the nitrogen atom, form a five-membered or six-membered ring which may or may not be interrupted by a hetero-atom.

Examples of preferred diazo components D$^2$—NH$_2$ are 2-amino-4,6-dinitrophenol, 3-amino-4-hydroxybenzenesulfonic acid, 2-hydroxy-3-amino-5nitrobenzenesulfonic acid, 3-amino-4-hydroxy-5-nitrobenzenesulfonic acid, 2-hydroxy-3-amino-5-chlorobenzenesulfonic acid, 2-aminopheno-4,6-disulfonic acid, 1-diazo-2-naphthol-4-sulfonic acid and 6-nitro-1-diazo-2-naphthol-4-sulfonic acid.

D$^3$—NH$_2$ is preferably one of the following amines: aniline-o-, -m- or -p-sulfonic acid, 3-chloro-4-aminobenzenesulfonic acid, 3-amino-4-chlorobenzenesulfonic acid, 2-amino-5-chlorobenzenesulfonic acid, 2-amino-5-methylbenzenesulfonic acid, 2-methyl-4-aminobenzenesulfonic acid, 2-amino-5-nitrobenzenesulfonic acid, 3-nitro-4-aminobenzenesulfonic acid, aniline-2,4- or -2,5-disulfonic acid, 2-naphthylamine-1-, 5-, 6-, 7- or 8-sulfonic acid, 2-naphthylamine-1,5-, 3,6-, 4,8-, 5,7- or 6,8-disulfonic acid, 2-naphthylamine-1,5,7-, 3,6,8- or 4,6,8-tridulfonic acid, 1-naphthylamine-2-, 3-, 4-, 5-, 6-, 7- or 8-sulfonic acid, 1-naphthylamine-3,6-, 3,7-, 3,8-, 4,7- or 4,8-disulfonic acid, 1-naphthylamine-3,6,8- or 4,6,8-trisulfonic acid, 4-aminodiphenylamine-2-sulfonic acid or 4-nitro-4'-aminodiphenylamine-2-sulfonic acid.

Having generally described the invention, a more complete understanding can be obtained by reference to the Examples which are provided herein for purposes of illustration only, and are not intended to be limiting unless otherwise specified.

EXAMPLES

Examples of particularly preferred components D$^1$—NH$_2$ are:

| T$^1$ | T$^2$ | T$^3$ |
|---|---|---|
| H | NH—SO$_2$—CH$_3$ | H |
| H | H | NH—SO$_2$—CH$_3$ |
| CH$_3$ | H | NH—SO$_2$—CH$_3$ |
| OCH$_3$ | H | NH—SO$_2$—CH$_3$ |
| Cl | H | NH—SO$_2$—CH$_3$ |
| SO$_3$H | H | NH—SO$_2$—CH$_3$ |
| H | NH—SO$_2$—CH$_3$ | SO$_3$H |
| H | H | NH—SO$_2$—CH$_2$—CH=CH$_2$ |
| H | NH—SO$_2$—N(CH$_3$)$_2$ | H |
| H | NH—SO$_2$—N(morpholino) | H |
| H | H | NH—SO$_2$—N(CH$_3$)$_2$ |
| H | H | NH—SO$_2$—N(morpholino) |
| H | NHSO$_2$—CH$_2$—CH=CH$_2$ | H |
| H | NH—SO$_2$—CH$_3$ | H |
| H | H | NH—SO$_2$—CH$_3$ |
| CH$_3$ | H | NH—SO$_2$—CH$_3$ |
| OCH$_3$ | H | NH—SO$_2$—CH$_3$ |
| Cl | H | NH—SO$_2$—CH$_3$ |
| SO$_3$H | H | NH—SO$_2$—CH$_3$ |
| H | NH—SO$_2$—CH$_3$ | SO$_3$H |
| H | H | NH—SO$_2$—CH$_2$—CH=CH$_2$ |
| H | NH—SO$_2$—N(CH$_3$)$_2$ | H |
| H | NH—SO$_2$—N(morpholino) | H |
| H | H | NH—SO$_2$—N(CH$_3$)$_2$ |
| H | H | NH—SO$_2$—N(morpholino) |
| H | NH—SO$_2$—CH$_2$—CH=CH$_2$ | H |

|  |  | -continued |
|---|---|---|
| T¹ | T² | T³ |

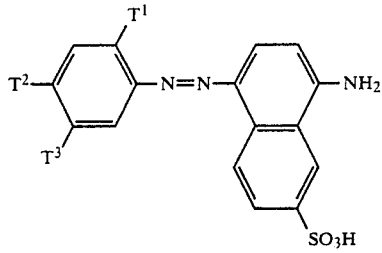

| H | NH—SO₂—CH₃ | H |
| H | H | NH—SO₂—CH₃ |
| CH₃ | H | NH—SO₂—CH₃ |
| OCH₃ | H | NH—SO₂—CH₃ |
| Cl | H | NH—SO₂—CH₃ |
| SO₃H | H | NH—SO₂—CH₃ |
| H | NH—SO₂—CH₃ | SO₃H |
| H | H | NH—SO₂—SO₂—CH=CH₂ |
| H | NH—SO₂—N(CH₃)₂ | H |
| H | NH—SO₂—N(morpholino) | H |
| H | H | NH—SO₂—N(CH₃)₂ |
| H | H | NH—SO₂—N(morpholino) |
| H | NH—SO₂—CH₂—CH=CH₂ | H |

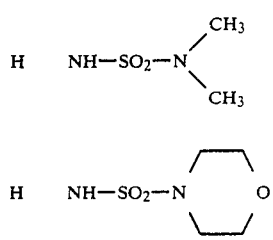

| H | NH—SO₂—CH₃ | H |
| H | H | NH—SO₂—CH₃ |
| CH₃ | H | NH—SO₂—CH₃ |
| OCH₃ | H | NH—SO₂—CH₃ |
| Cl | H | NH—SO₂—CH₃ |
| SO₃H | H | NH—SO₂—CH₃ |
| H | NH—SO₂—CH₃ | SO₃H |
| H | H | NH—SO₂—CH₂—CH=CH₂ |
| H | NH—SO₂—N(CH₃)₂ | H |
| H | NH—SO₂—N(morpholino) | H |

|  |  | -continued |
|---|---|---|
| T¹ | T² | T³ |
| H | H | NH—SO₂—N(CH₃)₂ |
| H | H | NH—SO₂—N(morpholino) |
| H | NH—SO₂—CH₂—CH=CH₂ | H |

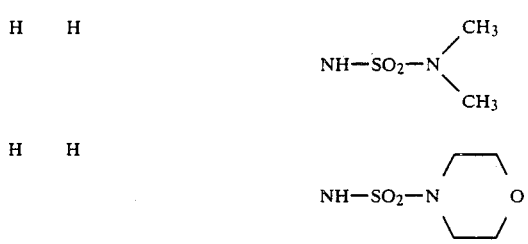

| H | NH—SO₂—CH₃ | H |
| H | H | NH—SO₂—CH₃ |
| CH₃ | H | NH—SO₂—CH₃ |
| OCH₃ | H | NH—SO₂—CH₃ |
| Cl | H | NH—SO₂—CH₃ |
| SO₃H | H | NH—SO₂—CH₃ |
| H | NH—SO₂—CH₃ | SO₃H |
| H | H | NH—SO₂—CH₂—CH=CH₂ |
| H | NH—SO₂—N(CH₃)₂ | H |
| H | NH—SO₂—N(morpholino) | H |
| H | H | NH—SO₂—N(CH₃)₂ |
| H | H | NH—SO₂—N(morpholino) |
| H | NH—SO₂—CH₂—CH=CH₂ | H |

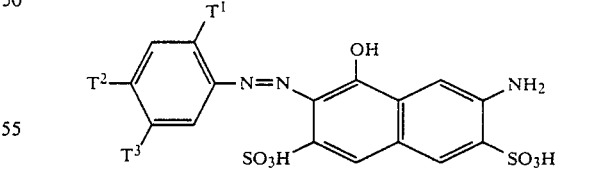

| H | NH—SO₂—CH₃ | H |
| H | H | NH—SO₂—CH₃ |
| CH₃ | H | NH—SO₂—CH₃ |
| OCH₃ | H | NH—SO₂—CH₃ |
| Cl | H | NH—SO₂—CH₃ |
| SO₃H | H | NH—SO₂—CH₃ |
| H | NH—SO₂—CH₃ | SO₃H |
| H | H | NH—SO₂—CH₂—CH=CH₂ |
| H | NH—SO₂—N(CH₃)₂ | H |

Column 9 (continued)

| T¹ | T² | T³ |
|---|---|---|
| H | NH—SO₂—N(morpholino) | H |
| H | H | NH—SO₂—N(CH₃)₂ |
| H | H | NH—SO₂—N(morpholino) |
| H | NH—SO₂—CH₂—CH=CH₂ | H |

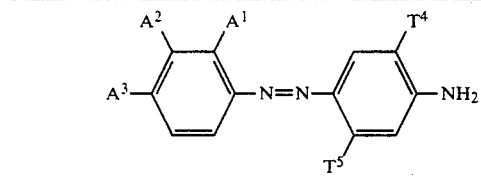

| A¹ | A² | A³ | T⁴ | T⁵ |
|---|---|---|---|---|
| H | H | SO₃H | H | NHSO₂CH₃ |
| H | SO₃H | H | H | NHSO₂CH₃ |
| SO₃H | H | H | H | NHSO₂CH₃ |
| SO₃H | H | NO₂ | H | NHSO₂CH₃ |
| SO₃H | H | SO₃H | H | NHSO₂CH₃ |
| H | H | SO₃H | CH₃ | NHSO₂CH₃ |
| H | SO₃H | H | CH₃ | NHSO₂CH₃ |
| SO₃H | H | H | CH₃ | NHSO₂CH₃ |
| SO₃H | H | NO₂ | CH₃ | NHSO₂CH₃ |
| SO₃H | H | SO₃H | H | NHSO₂CH₃ |
| H | H | SO₃H | OCH₃ | NHSO₂CH₃ |
| H | SO₃H | H | OCH₃ | NHSO₂CH₃ |
| SO₃H | H | H | OCH₃ | NHSO₂CH₃ |
| SO₃H | H | NO₂ | OCH₃ | NHSO₂CH₃ |
| SO₃H | H | SO₃H | OCH₃ | NHSO₂CH₃ |
| H | H | SO₃H | Cl | NHSO₂CH₃ |
| H | SO₃H | H | Cl | NHSO₂CH₃ |
| SO₃H | H | H | Cl | NHSO₂CH₃ |
| SO₃H | H | NO₂ | Cl | NHSO₂CH₃ |
| SO₃H | H | SO₃H | Cl | NHSO₂CH₃ |
| H | H | SO₃H | H | NHSO₂N(CH₃)₂ |
| H | SO₃H | H | H | NHSO₂N(CH₃)₂ |
| SO₃H | H | H | H | NHSO₂N(CH₃)₂ |
| SO₃H | H | NO₂ | H | NHSO₂N(CH₃)₂ |
| SO₃H | H | SO₃H | H | NHSO₂N(CH₃)₂ |
| H | H | SO₃H | H | NHSO₂N(morpholino) |
| H | SO₃H | H | H | NHSO₂N(morpholino) |
| SO₃H | H | H | H | NHSO₂N(morpholino) |

Column 10 (continued)

| | | | | |
|---|---|---|---|---|
| SO₃H | H | NO₂ | H | NHSO₂N(morpholino) |
| SO₃H | H | SO₃H | H | NHSO₂N(morpholino) |
| H | H | SO₃H | H | NHSO₂CH₂—CH=CH₂ |
| H | SO₃H | H | H | NHSO₂CH₂—CH=CH₂ |
| SO₃H | H | H | H | NHSO₂CH₂—CH=CH₂ |
| SO₃H | H | NO₂ | H | NHSO₂CH₂—CH=CH₂ |
| SO₃H | H | SO₃H | H | NHSO₂CH₂—CH=CH₂ |

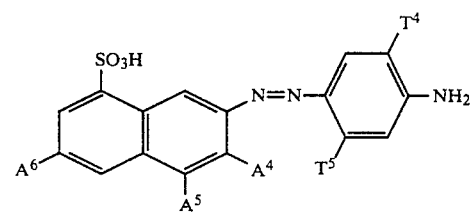

| A⁴ | A⁵ | A⁶ | T⁴ | T⁵ |
|---|---|---|---|---|
| H | SO₃H | H | H | NHSO₂CH₃ |
| SO₃H | H | H | H | NHSO₂CH₃ |
| H | SO₂H | SO₃H | H | NHSO₂CH₃ |
| H | SO₃H | H | CH₃ | NHSO₂CH₃ |
| SO₃H | H | SO₃H | CH₃ | NHSO₂CH₃ |
| H | SO₃H | SO₃H | CH₃ | NHSO₂CH₃ |
| H | SO₃H | H | OCH₃ | NHSO₂CH₃ |
| SO₃H | H | SO₃H | OCH₃ | NHSO₂CH₃ |
| H | SO₃H | SO₃H | OCH₃ | NHSO₂CH₃ |
| H | SO₃H | H | Cl | NHSO₂CH₃ |
| SO₃H | H | SO₃H | Cl | NHSO₂CH₃ |
| H | SO₃H | SO₃H | Cl | NHSO₂CH₃ |
| H | SO₃H | H | H | NHSO₂N(CH₃)₂ |
| SO₃H | H | SO₃H | H | NHSO₂N(CH₃)₂ |
| H | SO₃H | SO₃H | H | NHSO₂N(CH₃)₂ |
| H | SO₃H | H | H | NHSO₂N(morpholino) |
| SO₃H | H | SO₃H | H | NHSO₂N(morpholino) |
| H | SO₃H | SO₃H | H | NHSO₂N(morpholino) |
| H | SO₃H | H | H | NHSO₂CH₂—CH=CH₂ |
| SO₃H | H | SO₃H | H | NHSO₂CH₂—CH=CH₂ |
| H | SO₃H | SO₃H | H | NHSO₂CH₂—CH=CH₂ |

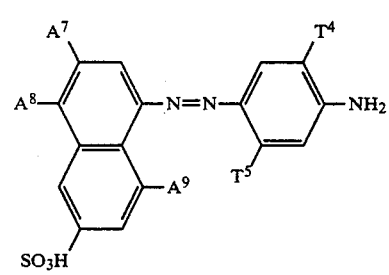

-continued

| $A^7$ | $A^8$ | $A^9$ | $T^4$ | $T^5$ |
|---|---|---|---|---|
| SO₃H | H | H | H | NHSO₂CH₃ |
| SO₃H | H | SO₃H | H | NHSO₂CH₃ |
| H | SO₃H | SO₃H | H | NHSO₂CH₃ |
| SO₃H | H | H | CH₃ | NHSO₂CH₃ |
| SO₃H | H | SO₃H | CH₃ | NHSO₂CH₃ |
| H | SO₃H | SO₃H | CH₃ | NHSO₂CH₃ |
| SO₃H | H | H | OCH₃ | NHSO₂CH₃ |
| SO₃H | H | SO₃H | OCH₃ | NHSO₂CH₃ |
| H | SO₃H | SO₃H | OCH₃ | NHSO₂CH₃ |
| SO₃H | H | H | Cl | NHSO₂CH₃ |
| SO₃H | H | SO₃H | Cl | NHSO₂CH₃ |
| H | SO₃H | SO₃H | Cl | NHSO₂CH₃ |
| SO₃H | H | H | H | NHSO₂N(CH₃)₂ |
| SO₃H | H | SO₃H | H | NHSO₂N(CH₃)₂ |
| H | SO₃H | SO₃H | H | NHSO₂N(CH₃)₂ |
| SO₃H | H | H | H | NHSO₂N⟨morpholino⟩ |
| SO₃H | H | SO₃H | H | NHSO₂N⟨morpholino⟩ |
| H | SO₃H | SO₃H | H | NHSO₂N⟨morpholino⟩ |
| SO₃H | H | H | H | NHSO₂CH₂—CH=CH₂ |
| SO₃H | H | SO₃H | H | NHSO₂CH₂—CH=CH₂ |
| H | SO₃H | SO₃H | H | NHSO₂CH₂—CH=CH₂ |

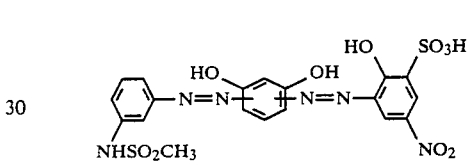

| $A^{10}$ | $A^{11}$ | $A^{12}$ | $T^4$ | $T^5$ |
|---|---|---|---|---|
| SO₃H | H | H | H | NHSO₂CH₃ |
| SO₃H | H | H | CH₃ | NHSO₂CH₃ |
| SO₃H | H | H | OCH₃ | NHSO₂CH₃ |
| SO₃H | H | H | Cl | NHSO₂CH₃ |
| SO₃H | H | H | H | NHSO₂N(CH₃)₂ |
| SO₃H | H | H | H | NHSO₂N⟨morpholino⟩ |
| SO₃H | H | H | H | NHSO₂CH₂—CH=CH₂ |
| H | SO₃H | NO₂ | H | NHSO₂CH₃ |
| H | SO₃H | NO₂ | CH₃ | NHSO₂CH₃ |
| H | SO₃H | NO₂ | OCH₃ | NHSO₂CH₃ |
| H | SO₃H | NO₂ | Cl | NHSO₂CH₃ |
| H | SO₃H | NO₂ | H | NHSO₂N(CH₃)₂ |
| H | SO₃H | NO₂ | H | NHSO₂N⟨morpholino⟩ |
| H | SO₃H | NO₂ | H | NHSO₂CH₂—CH=CH₂ |

EXAMPLE 1

18.6 parts of 3-methylsulfonylaminoaniline are dissolved in 50 parts by volume of 5N hydrochloric acid and are diazotized at 0–5° C. by the addition of an aqueous solution of 7 parts of sodium nitrite. The resulting diazo solution is poured into a stirred suspension, in 1,000 parts of water, of the coupling product which is obtained by diazotizing 23.4 parts of 2-hydroxy-3-amino-5-nitrobenzenesulfonic acid in a conventional manner and coupling the product to 11 parts of resorcinol, in a medium rendered alkaline with sodium carbonate. After the addition, the pH is increased to 9, and the mixture is stirred until coupling is complete. The resulting dye is filtered off, and stirred in 500 parts of water, 34 parts of iron(III) chloride are added at 60–70° C., and the pH of the mixture is then adjusted to 4 with sodium acetate. The mixture is stirred for one hour at 60–70° C., after which the metallization is complete, and the complexed dye is salted out at 60° C. amd pH 1–2 using potassium chloride, and is filtered off while hot, and dried. The iron complex of the compound of the formula

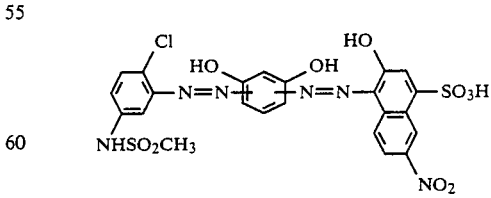

is obtained, and this product gives lightfast and wetfast brown dyeings on leather.

EXAMPLE 2

22 parts of 2-chloro-5-methylsulfonylaminoaniline are suspended in 100 parts of 5N hydrochloric acid, and the suspension is reacted with an aqueous solution of 7 parts of sodium nitrite at 0–5° C. The resulting diazo solution is allowed to run into a stirred suspension, in 1,000 parts of water, of the coupling product obtained in a conventional manner from 29.5 parts of 6-nitro-1-diazo-2-naphthol-4-sulfonic acid and 11 parts of resorcinol, and the pH of the mixture is then increased to 9–10. After coupling is complete, the dye is reacted, similarly to Example 1, with 34 parts of iron(III) chloride, and the iron complex of the compound of the formula is isolated; the product gives lightfast and wetfast brown dyeings on leather.

The compounds given in the table below are also obtained using methods similar to those described:

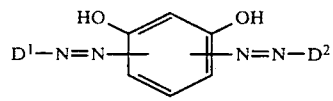

Fe complex

| Example No. | D¹ | D² | Dyeing on leather |
|---|---|---|---|
| 3 | ⟨benzene⟩-NHSO₂CH₃ | HO, NO₂, CH₃, SO₃H substituted benzene | brown |
| 4 | " | HO, SO₃H, CH₃, Cl substituted benzene | " |
| 5 | " | HO, CH₃, SO₃H naphthalene | " |
| 6 | " | HO, CH₃, SO₃H, NO₂ naphthalene | " |
| 7 | CH₃, CH₃, NHSO₂CH₃ substituted benzene | " | " |
| 8 | NHSO₂—N(CH₃)₂ substituted benzene | HO, CH₃, SO₃H, NO₂ naphthalene | " |
| 9 | SO₃H, CH₃, NHSO₂CH₃ benzene | HO, NO₂, CH₃, NO₂ benzene | " |
| 10 | HO₃S, H₃CO₂SHN— benzene | HO, CH₃, SO₃H, NO₂ naphthalene | " |
| 11 | morpholinosulfonyl benzene (HNSO₂N⟨O⟩) | HO, SO₃H, CH₃, NO₂ benzene | " |

-continued

Fe complex

| Example No. | D¹ | D² | Dyeing on leather |
|---|---|---|---|
| 12 | (H₃C)₂NO₂SHN— benzene | " | " |
| 13 | morpholinyl-NO₂SHN— benzene | " | " |
| 14 | NHSO₂CH₂—CH=CH₂ benzene | " | " |

EXAMPLE 15

18.6 parts of 3-methylsulfonylaminoaniline in 50 parts by volume of 5N hydrochloric acid are reacted with an aqueous solution of 7 parts of sodium nitrite. A neutral aqueous solution of 22.3 parts of 1-naphthylamine-6-sulfonic acid is then run slowly into the diazo solution. After the coupling is complete, the resulting product is filtered off under suction, and dissolved in dilute sodium hydroxide solution, an aqueous solution of 7 parts of sodium nitrite is added at 0–5° C., and thereafter the mixture is rendered acidic with dilute hydrochloric acid. After the diazotization is complete, the mixture is poured into an aqueous suspension of the compound obtained in a conventional manner by diazotizing 23.4 parts of 2-hydroxy-3-amino-5-nitrobenzenesulfonic acid and coupling the product to 11 parts of resorcinol, in a medium rendered alkaline with sodium carbonate. The coupling is completed in the alkaline range, and the resulting dye is then complexed with 34 parts of iron-(III) chloride in 500 parts of water at 60–70° C. and pH 4. The metal complex is salted out at 60° C. and pH 1-2 using potassium chloride, and is filtered off while hot, and dried. The iron complex of the compound of the formula

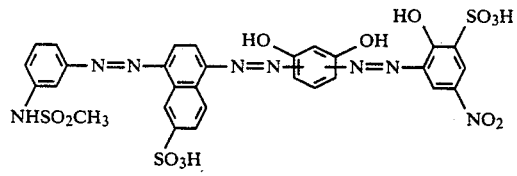

dyes leather in lightfast and wetfast reddish-brown hues.

EXAMPLE 16

18.6 parts of 4-methylsulfonylaminoaniline are dissolved in 100 parts by volume of 5N hydrochloric acid and an aqueous solution of 7 parts of sodium nitrite is added at 0°–5° C. An aqueous solution of 22.3 parts of 1-naphthylamine-6-sulfonic acid is then run into the diazo solution, and the product obtained after coupling is complete is diazotized by a procedure similar to that described in Example 15. Thereafter, the resulting diazo suspension is stirred into a suspension of the coupling product obtained from 29.5 parts of 6-nitro-1-diazo-2-naphthol-4-sulfonic acid and 11 parts of resorcinol, and the pH of the mixture is brought to 9. After coupling is complete, the product is reacted in a conventional manner with 34 parts of iron (III) chloride at pH 4, and, after metallization is complete, the reaction mixture is worked up as described above. The iron complex of the compound of the formula

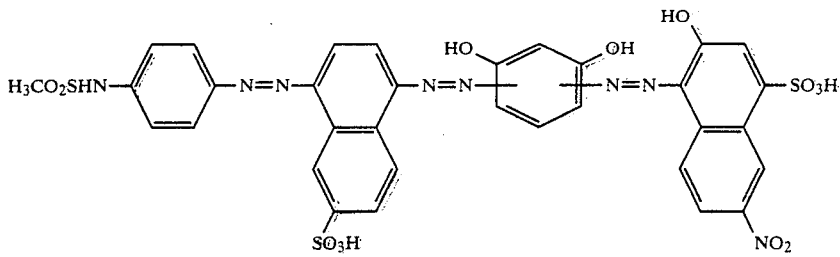

is obtained, and this product gives lightfast and wetfast reddish-brown dyeings on leather.

The compounds given in the table below are also obtained using methods similar to those described:

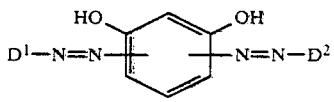

Fe complex

| Example No. | D¹ | D² | Dyeing on leather |
|---|---|---|---|
| 17 | ![D1: phenyl-NHSO2CH3 azo naphthyl-SO3H] | ![HO, SO3H, Cl benzene] | brown |
| 18 | " | ![HO, NO2, SO3H benzene] | " |
| 19 | " | ![HO, SO3H, SO3H benzene] | " |
| 20 | ![D1: phenyl-NHSO2CH3 azo naphthyl-SO3H] | ![HO, SO3H naphthyl] | " |
| 21 | " | ![HO, SO3H, NO2 benzene] | " |
| 22 | ![CH3SO2NH-phenyl azo naphthyl-SO3H] | ![HO, SO3H, NO2 benzene] | " |

-continued
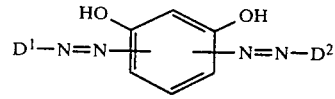
Fe complex
| Example No. | D¹ | D² | Dyeing on leather |
|---|---|---|---|
| 23 | " | 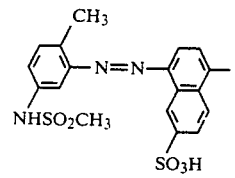 | " |
| 24 | 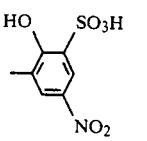 | 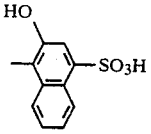 | " |
| 25 | " | 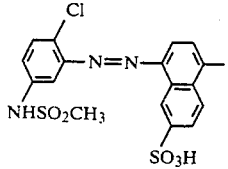 | " |
| 26 | 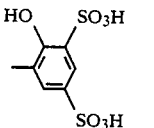 | 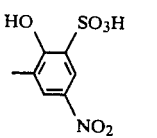 | " |
| 27 | " | 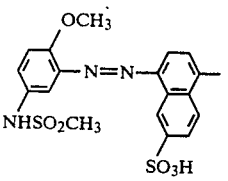 | " |
| 28 | 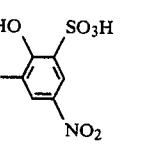 | " | " |
| 29 | 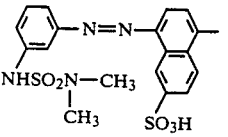 | " | " |
| 30 | 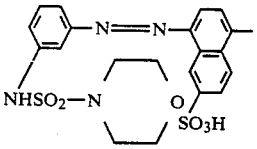 | " | " |

-continued

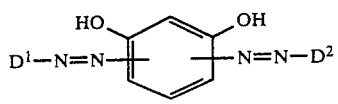

Fe complex

| Example No. | D¹ | D² | Dyeing on leather |
|---|---|---|---|
| 31 | SO₃H, NHSO₂CH₃ substituted phenyl-N=N-naphthyl-SO₃H | HO, NO₂, NO₂ substituted phenyl | " |
| 32 | " | HO, SO₃H, NO₂ substituted naphthyl | " |
| 33 | SO₃H, CH₃O₂SHN substituted phenyl-N=N-naphthyl-SO₃H | HO, SO₃H, NO₂ substituted naphthyl | " |
| 34 | NHSO₂CH₂—CH=CH₂ substituted phenyl-N=N-naphthyl-SO₃H | HO, SO₃H, NO₂ substituted phenyl | " |

EXAMPLE 35

A solution of 18.6 parts of 4-methylsulfonylaminoailine which contains hydrochloric acid is diazotized, and the diazo solution is stirred into an aqueous solution of 7-amino-1-naphthol-3-sulfonic acid at pH 10. After coupling is complete, the product is brought into aqueous solution at pH 10, an aqueous solution of 7 parts of sodium nitrite is added, and with the mixture is slowly poured into excess dilute hydrochloric acid. The resulting diazonium compound is then stirred into a suspension of the coupling product obtained from 29.5 parts of 6-nitro-1-diazo-2-naphthol-4-sulfonic acid and 11 parts of resorcinol, and the pH of the mixture is brought to 9-10. After coupling is complete, the product is reacted, as described in Example 15, with iron (III) chloride, and the metallized dye of the formula

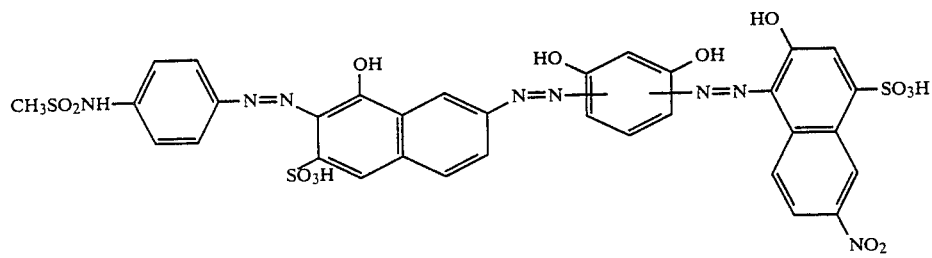

is isolated; this product gives lightfast and wetfast brown dyeings on leather.

The compounds given in the table below are also obtained using a method similar to that described:

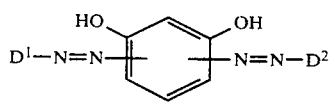

Fe complex

| Example No. | D¹ | D² | Dyeing on leather |
|---|---|---|---|
| 36 | H₃CO₂SNH—⟨⟩—N=N— (naphthalene with OH, SO₃H, CH₃) | HO, SO₃H, CH₃, NO₂ (benzene) | brown |
| 37 | ⟨⟩—N=N— NHSO₂CH₃, SO₃H (naphthalene with OH, CH₃, SO₃H) | HO, SO₃H, CH₃, NO₂ (naphthalene) | " |
| 38 | ⟨⟩—N=N— NHSO₂CH₃, SO₃H (naphthalene with OH, CH₃, SO₃H) | " | " |
| 39 | (H₃C)₂N—O₂SHN—⟨⟩—N=N— (naphthalene with OH, SO₃H, CH₃) | " | " |
| 40 | H₂C=CH—CH₂—SO₂—NH—⟨⟩—N=N— (naphthalene with CH₃, CH₃, SO₃H) | " | " |
| 41 | CH₃, ⟨⟩—N=N— NHSO₂CH₃, SO₃H (naphthalene with OH, CH₃) | " | " |
| 42 | CH₃, ⟨⟩—N=N— NHSO₂CH₃, SO₃H (naphthalene with OH, CH₃) | " | " |
| 43 | ⟨⟩—N=N— NHSO₂CH₃, SO₃H (naphthalene with OH, CH₃) | " | " |

EXAMPLE 44

21.8 parts of 2-amino-5-nitrobenzenesulfonic aice are diazotized in a convention manner, and the diazo solution is added to a solution of 1806 parts of 3-methylsulfonyaminoaniline in 50 parts by volume of 5N hydrochloric acid. After coupling is complete, the product is diazotized as described in Example 35, and the diazo suspension is poured, at pH 9, into the suspension of t coupling product obtained from 23.4 parts of diazotiz 2-hydroxy-3-amino-5-nitrobenzenesulfonic acid and parts of resorcinol. After coupling is complete, t product is complexed, as described above, with 34 pa of iron (III) chloride at pH 4, and the metal complex the compound of the formula

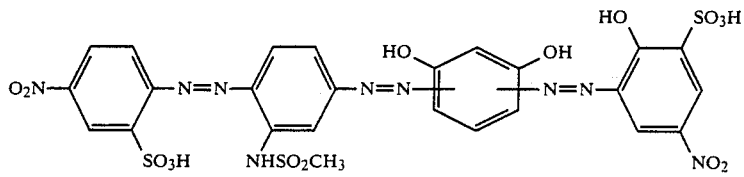

is isolated and dried. It dyes leather in lightfast and wetfast reddish-brown hues.

The compounds given in the table below are also obtained using a method similar to that described:

| Example No. | D¹ | D² | Dyeing on leather |
|---|---|---|---|
| 45 | HO₃S—⟨⟩—N=N—⟨⟩— with NHSO₂CH₃ | HO, SO₃H, NO₂ substituted phenyl | brown |
| 46 | " | HO, NO₂, SO₃H substituted phenyl | " |
| 47 | " | HO, SO₃H, Cl substituted phenyl | " |
| 48 | ⟨SO₃H⟩—N=N—⟨NHSO₂CH₃⟩— | HO, SO₃H, NO₂ substituted phenyl | " |
| 49 | HO₃S—⟨SO₃H⟩—N=N—⟨NHSO₂CH₃⟩— | HO, NO₂, NO₂ substituted phenyl | " |
| 50 | HO₃S—⟨⟩—N=N—⟨CH₃, NHSO₂CH₃⟩— | HO, SO₃H, SO₃H substituted phenyl | " |
| 51 | " | HO, SO₃H, NO₂ substituted phenyl | " |
| 52 | HO₃S—⟨⟩—N=N—⟨OCH₃, NHSO₂CH₃⟩— | HO, SO₃H, SO₃H substituted phenyl | " |

-continued

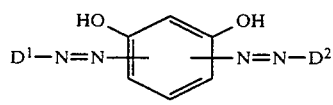

Fe complex

| Example No. | D¹ | D² | Dyeing on leather |
|---|---|---|---|
| 53 | " | HO─⟨SO₃H, CH₃, NO₂⟩ | " |
| 54 | HO₃S─⟨⟩─N=N─⟨⟩─ with NHSO₂CH₂─CH=CH₂ | " | " |
| 55 | HO₃S─⟨⟩─N=N─⟨⟩─ with NHSO₂N(CH₃)₂ | HO─⟨SO₃H, CH₃, NO₂⟩ | " |
| 56 | O₂N─⟨SO₃H⟩─N=N─⟨⟩─ with NHSO₂N(CH₃)₂ | " | " |
| 57 | HO₃S─⟨⟩─N=N─⟨⟩─ with NHSO₂N(morpholino) | HO─⟨SO₃H, CH₃, NO₂⟩ | " |
| 58 | " | HO─naphthalene─SO₃H, NO₂ | " |
| 59 | HO₃S─⟨⟩─N=N─⟨⟩─ with CH₃─N─SO₂CH₃ | HO─⟨SO₃, CH₃, NO₂⟩ | " |
| 60 | " | HO─⟨SO₃H, CH₃, SO₃H⟩ | " |

EXAMPLE 61

30.3 parts of 1-naphthylamine-3,6-disulfonic acid are diazotized in a convention manner. The resulting diazo solution is stirred into a solution of 18.6 parts of 3-methylsulfonylaminoaniline which contains hydrochloric acid, and thereafter the pH of the mixture is brought to 2 with sodium acetate. After coupling is complete, the resulting compound is dissolved in dilute sodium hydroxide solution, an aqueous solution of 7 parts of sodium nitrite is added, and the mixture is poured into excess hydrochloric acid at 0°-5° C. The resulting diazo solution is poured into an aqueous suspension of the compound obtained by coupling, in a conventional manner, 29.5 parts of 6-nitro-1-diazo-2-naphthol-4-sulfonic acid to 11 parts of resorcinol in a medium rendered alkaline with sodium carbonate, and the pH of the mixture is brought to 8-9. An aqueous suspension of the resulting dye is stirred with 34 parts of iron (III) chloride at 70° C. and pH 4 until complex formation is complete, and thereafter the product is saled out at pH 1 using potasium chloride, and is isolated and dried. The iron complex of the compound of the formula

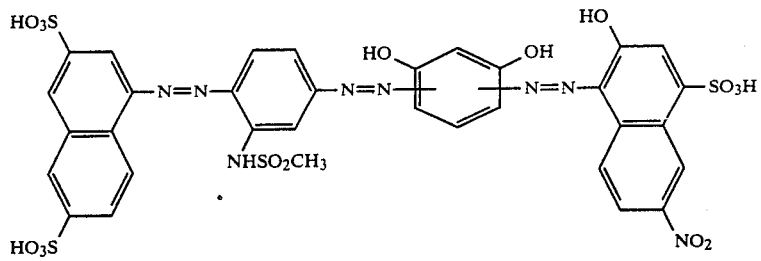

dyes leather in lightfast and wetfast dark brown hues.

EXAMPLE 62

19.9 parts of 2-amino-4,6-dinitrophenol are diazotized in a conventional manner, and the product is coupled to 11 parts of resorcinol in a medium rendered alksline with sodium carbonate. To the resulting compound, the diazo compound of the coupling product formed from 30.3 parts of 1-naphthylamino-3,6-disulfonic acid and 18.6 parts of 3-methylsulfonylaminoaniline is added, this diazo compound being described in Example 61. After the coupling in a medium rendered alkaline with sodium carbonate is complete, the product is reacted with 34 parts of iron (III) chloride at pH 4. The iron complex of the compound of the formula

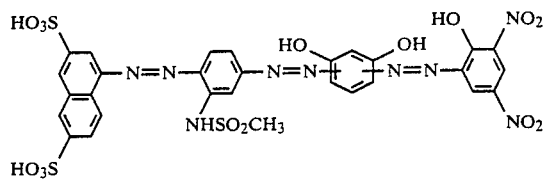

is isolated in a conventional manner, and this product gives lightfast and wetfast deep brown dyeings on leather.

EXAMPLE 63

30.3 parts of 2-naphthylamino-5,8-disulfonic acid are diazotized, and the product is coupled to 15 parts of 3-aminoacetanilide at pH 2. 7 parts of sodium nitrite are added in a conventional manner to an alkaline solution of the compound, and diazotization is then effected by pouring the mixture into excess hydrochloric acid. The diazonium salt is then coupled, similarly to Example 61, to the coupling product obtained from 29.5 parts of 6-nitro-1-diazo-2-naphthol-4-sulfonic acid and 11 parts of resorcinol. After complex formation with iron (III) chloride in a conventional manner, the iron complex of the compound of the formula

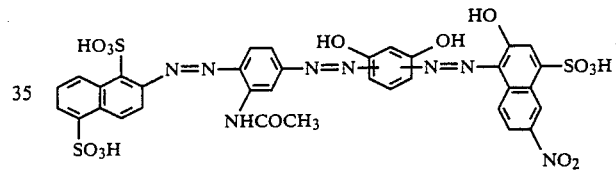

is isolated; this product dyes leather in lightfast and wetfast brown hues.

The compound given in the table below are also obtained using methods similar to those described:

$$D^1-N=N-\underset{HO}{\bigcirc}-N=N-D^2$$

Fe complex

| Example No. | $D^1$ | $D^2$ | Dyeing on leather |
|---|---|---|---|
| 64 | ![structure with SO3H naphthyl-N=N-phenyl-NHSO2CH3] | ![structure HO, NO2, NO2 phenyl] | dark brown |
| 65 | ![structure SO3H-naphthyl-SO3H-N=N-phenyl-NHSO2CH3] | " | " |

-continued

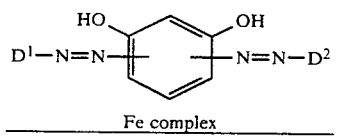

Fe complex

| Example No. | D¹ | D² | Dyeing on leather |
|---|---|---|---|
| 66 | naphthalene-1,6-disulfonic acid, 7-azo linked to phenyl with NHSO₂CH₃ and CH₃ | " | " |
| 67 | naphthalene-1,4-disulfonic acid, 7-azo linked to phenyl with NHSO₂CH₃ and CH₃ | 3-hydroxy-8-sulfo-4-methyl-6-nitronaphthalene | " |
| 68 | naphthalene-1,5-disulfonic acid, 4-azo linked to phenyl with NHSO₂CH₃ and CH₃ | 2-hydroxy-3,5-dinitro-6-methylphenyl | " |
| 69 | naphthalene-1,4-disulfonic acid, 7-azo linked to phenyl with CH₃, CH₃, NHSO₂CH₃ | 3-hydroxy-8-sulfo-4-methyl-6-nitronaphthalene | " |
| 70 | naphthalene-2,6-disulfonic acid, 4-azo linked to phenyl with CH₃, CH₃, NHSO₂CH₃ | " | " |
| 71 | naphthalene-1,4-disulfonic acid, 7-azo linked to phenyl with OCH₃, CH₃, NHSO₂CH₃ | 2-hydroxy-3,5-dinitro-6-methylphenyl | " |

-continued

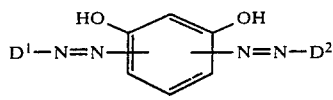
Fe complex

| Example No. | D¹ | D² | Dyeing on leather |
|---|---|---|---|
| 72 | " | 3-hydroxy-8-nitronaphthalene-1-sulfonic acid coupler (HO, SO₃H, NO₂) | " |
| 73 | 4-[(2-methoxy-4-methyl-6-methylsulfonylamino)phenylazo]-naphthalene-2,6-disulfonic acid (HO₃S, OCH₃, NHSO₂CH₃, HO₃S) | " | " |
| 74 | 4-[(4-chloro-5-methyl-2-methylsulfonylamino)phenylazo]-naphthalene-2,6-disulfonic acid (HO₃S, Cl, NHSO₂CH₃, HO₃S) | 3-hydroxy-8-nitronaphthalene-1-sulfonic acid (HO, SO₃H, NO₂) | " |
| 75 | 7-[(5-methyl-2-allylsulfonylamino)phenylazo]naphthalene-1,4-disulfonic acid (SO₃H, NHSO₂CH₂CH=CH₂, SO₃H) | " | " |
| 76 | 4-[(2-acetylamino-5-methyl)phenylazo]-naphthalene-2,6-disulfonic acid (HO₃S, NHCOCH₃, HO₃S) | 2,4-dinitro-6-methylphenol (HO, NO₂, NO₂) | brown |

-continued $$D^1-N=N-\underset{\text{Fe complex}}{\overset{HO\phantom{XX}OH}{\bigcirc}}-N=N-D^2$$

| Example No. | D¹ | D² | Dyeing on leather |
|---|---|---|---|
| 77 | naphthalene with HO₃S at 3 and 6 positions, N=N to phenyl with NHC(=O)CH₃ and CH₃ | naphthalene with HO, SO₃H, NO₂ | " |
| 78 | naphthalene with SO₃H at 1 and 4 positions, N=N to phenyl with NHSO₂N(CH₃)₂ and CH₃ | " | dark brown |
| 79 | naphthalene with HO₃S at 3 and 6 positions, N=N to phenyl with NHSO₂N(CH₃)₂ and CH₃ | " | " |
| 80 | naphthalene with HO₃S at 3 and 6 positions, N=N to phenyl with NHSO₂-morpholine and CH₃ | " | " |
| 81 | naphthalene with SO₃H at 1 and 4 positions, N=N to phenyl with NHC(=O)C₂H₄C(=O)OH and CH₃ | phenyl with HO, SO₃H, NO₂, CH₃ | brown |

EXAMPLE 82

34.7 parts of 2-naphthylamine-3,6,8-trisulfonic acid are diazotized in a customary manner, and the diazo solution is stirred into a suspension of 20 parts of 2-methyl-5-methylsulfonylaminoaniline in 100 parts of 5N hydrochloric acid. The product is diazotized further as described in Example 61, and the diazo compound is coupled at pH 9-10, to the product obtained from 29.5 parts of 6-nitro-1-diazo-2-naphthol-4-sulfonic acid and 11 parts of resorcinol. The resulting compound is complexed with Fe(III) chloride, and the iron complex of the compound of the formula

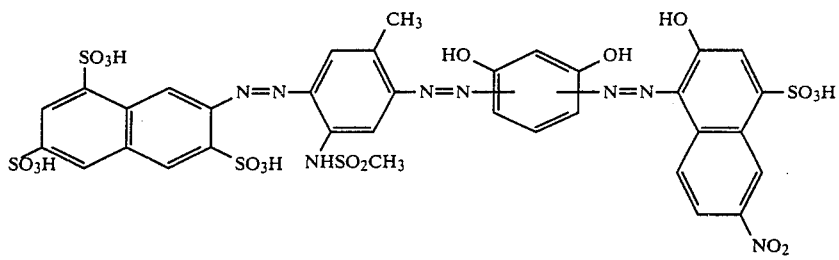

is obtained in the manner described; this product gives lightfast and wetfast deep brown dyeings on leather.

The compounds given in the table below are also obtained using a method similar to that described:

| Example No. | D¹ | D² | Dyeing on leather |
|---|---|---|---|
| 83 | naphthalene with SO₃H, HO₃S, HO₃S substituents, —N=N— linked to phenyl with NHSO₂CH₃ | HO, NO₂, NO₂, CH₃ substituted benzene | dark brown |
| 84 | naphthalene with SO₃H, SO₃H, SO₃H substituents, —N=N— linked to phenyl with NHSO₂CH₃ | " | " |
| 85 | " | HO, CH₃ naphthalene with SO₃H, NO₂ | " |
| 86 | naphthalene with SO₃H, SO₃H, SO₃H substituents, —N=N— linked to phenyl with NHSO₂CH₃ | " | " |
| 87 | HO₃S, SO₃H, HO₃S substituted naphthalene, —N=N— linked to phenyl with NHSO₂CH₃ | " | " |

-continued

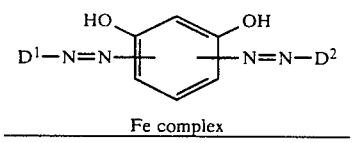

Fe complex

| Example No. | D¹ | D² | Dyeing on leather |
|---|---|---|---|
| 88 | naphthalene with SO₃H, SO₃H, SO₃H substituents, azo-linked to tolyl with CH₃ and NHSO₂CH₃ | " | brown |
| 89 | naphthalene with SO₃H, SO₃H, SO₃H substituents, azo-linked to tolyl with CH₃ and NHSO₂CH₃ | " | " |
| 90 | naphthalene with SO₃H, SO₃H, SO₃H substituents, azo-linked to phenyl with OCH₃, CH₃ and NHSO₂CH₃ | " | dark brown |
| 91 | " | 2,4-dinitrophenol with methyl | " |
| 92 | naphthalene with SO₃H, SO₃H, SO₃H substituents, azo-linked to phenyl with Cl, CH₃ and NHSO₂CH₃ | " | brown |
| 93 | " | " | " |
| 94 | naphthalene with SO₃H, SO₃H, SO₃H substituents, azo-linked to phenyl with NHSO₂CH₂CH=CH₂ | " | " |

-continued

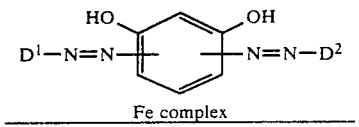

Fe complex

| Example No. | D¹ | D² | Dyeing on leather |
|---|---|---|---|
| 95 | 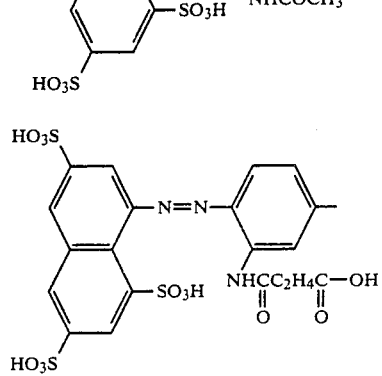 (naphthalene with HO₃S, HO₃S, SO₃H substituents, N=N, NHCOCH₃) | " | " |
| 96 | (naphthalene with HO₃S, HO₃S, SO₃H, N=N, NHCOC₂H₄C(=O)—OH) | " | " |
| 97 | (naphthalene with SO₃H, SO₃H, SO₃H, N=N, NHSO₂N(CH₃)₂) | " | dark brown |

EXAMPLE 98

27.7 parts of 4-nitro-4'-aminodiphenylamine-2-sulfonic acid are diazotized in a conventional manner, and the product is combined with a solution of 3-methylsulfonylaminoaniline which contains hydrochloric acid. The pH of the mixture is then increased to 6.5. After coupling is complete, 7 parts of sodium nitrite are added to an alkaline solution of the compound obtained, and the mixture is rapidly poured into excess dilute hydrochloric acid. The resulting diazo compound is stirred into a suspension of the compound obtained by coupling 29.5 parts of 6-nitro-1-diazo-2-naphthol-4-sulfonic acid to 11 parts of resorcinal in a medium rendered alkaline with sodium carbonate, and stirring is continued at pH 9 until coupling is complete. 34 parts of iron(III) chloride are then added at pH 4, and the mixture is stirred for 1 hour at 60°–70° C. After metallization is complete, the metal complex is salted out at pH 1–2 using potassium chloride, and is isolated and dried. The iron complex of the compound of the formula

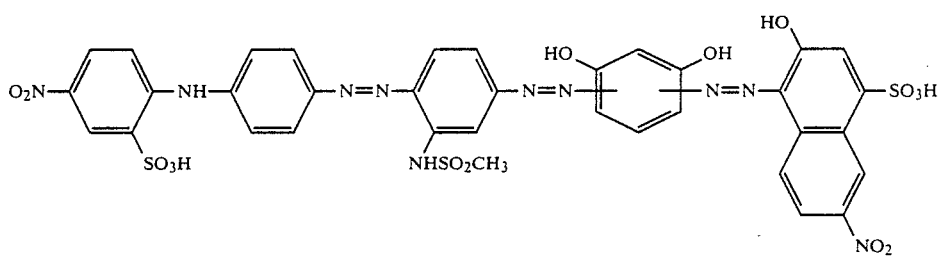

is obtained, and this product dyes leather in lightfast and wetfast dark brown hues.

The compounds given in the table below are also obtained using a method similar to that described:

| Example No. | D¹ | D² | Dyeing on leather |
|---|---|---|---|
| | \[structure: HO, OH substituted benzene with D¹—N=N— and —N=N—D², Fe complex\] | | |
| 99 | 4-nitro-2-(sulfophenylamino)phenyl linked via —NH— to phenyl—N=N—(3-methyl-6-methanesulfonamido)phenyl (with CH₃ and NHSO₂CH₃ substituents; SO₃H on middle ring) | 3-hydroxy-7-nitronaphthalene-1-sulfonic acid (HO, SO₃H, NO₂ substituents) | dark brown |
| 100 | " | 2-hydroxy-5-methylbenzene-1,4-disulfonic acid (HO, SO₃H, SO₃H, CH₃) | " |
| 101 | phenyl—NH—(2-sulfo)phenyl—N=N—(3-methyl-6-methanesulfonamido)phenyl | 2-hydroxy-5-methyl-3-nitrobenzenesulfonic acid (HO, SO₃H, NO₂, CH₃) | " |
| 102 | " | 3-hydroxy-4-methyl-7-nitronaphthalene-1-sulfonic acid (HO, SO₃H, CH₃, NO₂) | " |
| 103 | phenyl—NH—(2-sulfo)phenyl—N=N—(3-methyl-4-methyl-6-methanesulfonamido)phenyl (CH₃, NHSO₂CH₃) | " | " |
| 104 | phenyl—NH—(2-sulfo)phenyl—N=N—(3-methoxy-6-methanesulfonamido)phenyl (OCH₃, NHSO₂CH₃) | " | " |
| 105 | phenyl—NH—(2-sulfo)phenyl—N=N—(3-chloro-4-methyl-6-methanesulfonamido)phenyl (Cl, NHSO₂CH₃) | 2-hydroxy-5-methylbenzene-1,4-disulfonic acid (HO, SO₃H, SO₃H) | " |

EXAMPLE 106

An aqueous solution of 7 parts of sodium nitrite is added to 18.6 parts of 4-methylsulfonylaminoaniline in 50 parts by volume of 5N hydrochloric acid at 0°–5° C. The diazo solution is then poured into a stirred suspension, in 1,000 parts of water, of the coupling product obtained by diazotizing 23.4 parts of 2-hydroxy-3-amino-5-nitrobenzenesulfonic acid in a conventional manner and coupling the product to 11 parts of resorcinol in a medium rendered alkaline with sodium carbonate. After the addition, the pH is increased to 9, and the mixture is stirred until coupling is complete. A diazo solution obtained from 21.8 parts of 2-amino-5-nitrobenzenesulfonic acid in a conventional manner is then allowed to run into the mixture at pH 9–9.5, and stirring is continued until the coupling is complete. The resulting dye is complexed with 34 parts of iron(III) chloride in a conventional manner, and the iron complex of the compound of the formula

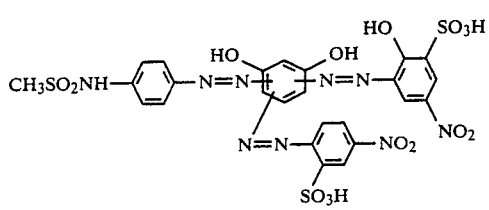

is isolated; this product gives lightfast and wetfast dark brown dyeings on leather.

EXAMPLE 107

30.3 parts of 1-naphthylamine-3,6-disulfonic acid are diazotized using a procedure similar to that described in Example 61, the product is coupled to 18.6 parts of 3-methylsulfonylaminoaniline, the resulting monoazo dye is diazotized further, and the product is coupled to the coupled product obtained from 29.5 parts of 6-nitro-1-diazo-2-naphthol-4-sulfonic acid. Thereafter, a diazo solution prepared from 12.3 parts of o-anisidine in a conventional manner is run into the mixture at 0°–5° C., the pH is brought to 9 with $Na_2CO_3$ solution, and the mixture is stirred until coupling is complete. The resulting dye is complexed with 34 parts of iron(III) chloride at 60°–70° C., and the iron complex of the compound of the formula

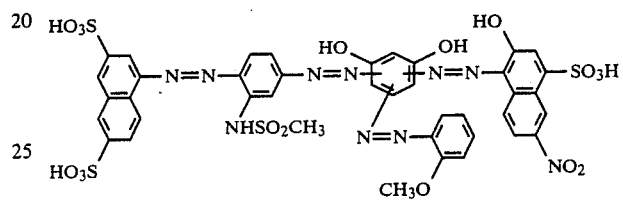

is isolated in a conventional manner; this product gives lightfast and wetfast dark brown dyeings on leater.

The compounds given in the table below are also obtained using methods similar to those described:

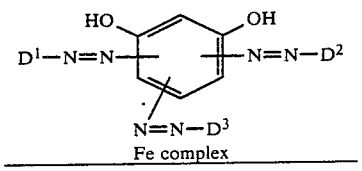

Fe complex

| Example No. | D¹ | D² | D³ | Dyeing on leather |
|---|---|---|---|---|
| 108 | -NH-C6H4-N=N-C6H3(NHSO2CH3)-) | | | dark brown |
| 109 | " | ![](HO-naphthyl-SO3H, NO2) | | " |
| 110 | -N=N-C6H2(CH3)(NHSO2CH3)-) | " | | " |

-continued

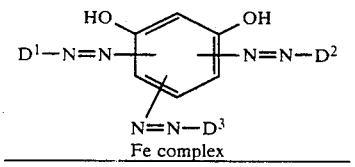
Fe complex

| Example No. | $D^1$ | $D^2$ | $D^3$ | Dyeing on leather |
|---|---|---|---|---|
| 111 | " | " | 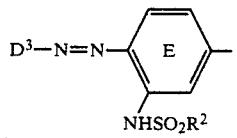 | " |
| 112 | " |  | " | " |

Having now fully described the invention, it will be apparent to one of ordinary skill in the art that many changes and modifications can be made thereto, without departing from the spirit or scope of the invention as set forth therein.

We claim:

1. A dye, which is free of reactive groups and contains two or three sulfonic acid groups, of the formula:

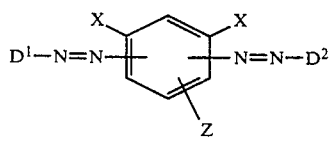 (I)

wherein
$D^1$ is

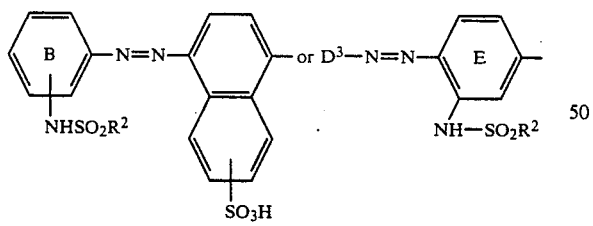

Z is hydrogen or $D^4$-N=N-;
$D^2$ is phenyl substituted by hydroxyl, hydroxysulfonyl, chlorine or nitro, or is naphthyl substituted by hydroxy, hydroxysulfonyl or nitro;
X, independently of one antoher, are hydroxyl or amino,
$D^3$ is phenyl which is substituted by hydroxysulfonyl, chlorine, bromine, methyl, methoxy, ethoxy, nitro, phenylamino, sulfophenylamino or nitrosulfophenylamino, or is naphthyl which is substituted by hdroxysulfonyl;
$D^4$ is phenyl which is unsubstituted or substituted by methyl, ethyl, methoxy, ethoxy, chlorine, bromine, nitro, sulfamoyl or hydroxysulfonyl, or is naphthyl which is substituted by hdroxysulfonyl; and
$R^2$ is methyl, ethyl or allyl;
the rings B and E may additionally be substituted by methyl, ethyl, methoxy, ethoxy, chlorine, bromine or hydroxysulfonyl, with the proviso that $D^2$ has a hydroxyl group ortho to the azo bond; or
the iron, manganese, cobalt, chromium, nickel or copper complexes of this dye.

2. The dye of claim 1, wherein Z is $D^4$-N=N-.
3. The dye of claim 1, wherein X is hydroxyl.
4. The dye of claim 1, wherein $D^2$ is naphthyl substituted by hydroxy, hydroxysulfonyl or nitro.
5. The dye of claim 1, wherein $D^3$ is phenyl substituted by phenylamino, sulfophenylamino or nitrosulfophenylamino; or is sulfonaphthyl.
6. The dye of claim 1, wherein $D^4$ is phenyl or phenyl substituted my methyl, ethyl, methoxy, ethoxy, chlorine, bromine or nitro.
7. The dye of claim 1, wherein $D^1$ is

[structure: $D^3$—N=N—E— with NHSO$_2$R$^2$]

8. The dye of claim 1, wherein $D^1$ is

[structure: $D^3$—N=N—ring with R$^5$ and NHSO$_2$R$^2$], and $R^5$ is methyl, ethyl, methoxy, ethoxy, chlorine, bromine or hydroxysulfonyl.
9. The dye of claim 8, wherein $R^5$ is methyl.
10. The dye of claim 1, having altogether two sulfo groups.

11. The dye of claim 1, in the form of the iron or copper complex.
12. The dye of claim 11, in the form of the iron complex.
13. The dye of claim 1, of the formula
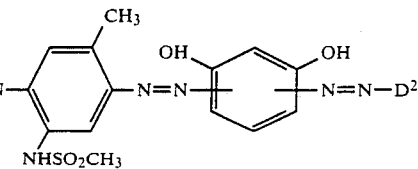
wherein $D^2$ and $D^3$ have the meanings given in claim 9.
14. The dye of claim 1, of the formula
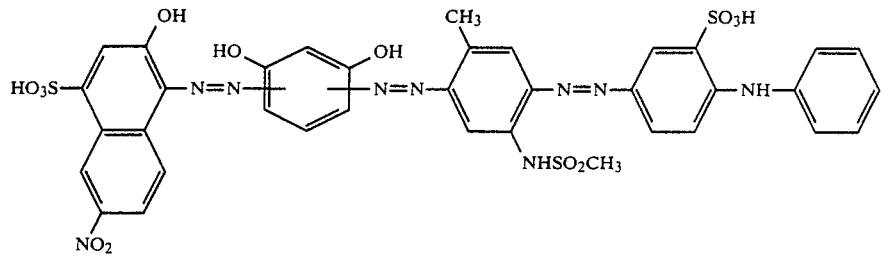
as the iron complex.